(12) United States Patent
Witzman et al.

(10) Patent No.: US 9,097,854 B2
(45) Date of Patent: Aug. 4, 2015

(54) OPTICAL DEVICE EXHIBITING COLOR SHIFT UPON ROTATION

(71) Applicant: JDS Uniphase Corporation, Milpitas, CA (US)

(72) Inventors: Matthew R. Witzman, Santa Rosa, CA (US); Jason Satern, Santa Rosa, CA (US); Roger W. Phillips, Santa Rosa, CA (US); Oleg Bouevitch, Ottawa (CA)

(73) Assignee: JDS Uniphase Corporation, Milpitas, CA (US)

( * ) Notice: Subject to any disclaimer, the term of this patent is extended or adjusted under 35 U.S.C. 154(b) by 0 days.

(21) Appl. No.: 13/931,360

(22) Filed: Jun. 28, 2013

(65) Prior Publication Data

US 2013/0285362 A1    Oct. 31, 2013

Related U.S. Application Data

(62) Division of application No. 12/584,339, filed on Sep. 3, 2009, now Pat. No. 8,498,033.

(60) Provisional application No. 61/191,097, filed on Sep. 5, 2008.

(51) Int. Cl.
*G02B 5/28* (2006.01)
*B29D 11/00* (2006.01)
*B42D 15/00* (2006.01)

(52) U.S. Cl.
CPC .......... *G02B 5/285* (2013.01); *B29D 11/00605* (2013.01); *B42D 15/00* (2013.01); *G02B 5/286* (2013.01)

(58) Field of Classification Search
CPC ........ G02B 5/285; G02B 5/286; B42D 15/00; B42D 25/00; B42D 25/20; B42D 25/29; B42D 25/30; B42D 25/328; B42D 25/34
USPC ................................. 359/2, 567, 574; 283/86
See application file for complete search history.

(56) References Cited

U.S. PATENT DOCUMENTS 3,338,730 A    8/1967    Slade et al. .................... 428/142
5,135,812 A    8/1992    Phillips et al. ................. 428/403
(Continued)

FOREIGN PATENT DOCUMENTS

AU    2005200844    3/2005    ............. B42D 15/10
CA    2471357    7/2003    ............. B42D 15/00
(Continued)

OTHER PUBLICATIONS

European Search Report from corresponding EP application No. 09169421.6.

*Primary Examiner* — Stephone B Allen
*Assistant Examiner* — Kimberly N Kakalec
(74) *Attorney, Agent, or Firm* — Matthew A. Pequignot; Pequignot + Myers LLC

(57) ABSTRACT

An optical device exhibiting a color shift upon rotation is disclosed. The optical device has a textured surface having a relief structure finer than a human eye resolution but large enough not to exhibit diffraction effects. The textured surface is coated with an interference thin film that exhibits a color shift with tilt. A uniform color seen at one angle of rotation changes to another uniform color when the optical device is rotated in its own plane. A method of manufacturing of such an optical device, as well as the use of the optical device as an optical security and authentication element, is also disclosed.

15 Claims, 14 Drawing Sheets
(4 of 14 Drawing Sheet(s) Filed in Color)

(56) References Cited

U.S. PATENT DOCUMENTS

| | | | |
|---|---|---|---|
| 5,214,530 A | 5/1993 | Coombs et al. | 359/359 |
| 5,278,590 A | 1/1994 | Phillips et al. | 359/589 |
| 5,279,657 A | 1/1994 | Phillips et al. | 106/31.65 |
| 5,571,624 A | 11/1996 | Phillips et al. | 428/403 |
| 5,825,547 A | 10/1998 | Lee | 359/567 |
| 5,876,068 A * | 3/1999 | Schneider et al. | 283/86 |
| 6,243,204 B1 | 6/2001 | Bradley, Jr. et al. | 359/585 |
| 6,761,959 B1 | 7/2004 | Bonkowski et al. | 428/156 |
| 6,797,366 B2 | 9/2004 | Hanson et al. | 428/201 |
| 6,833,959 B2 | 12/2004 | Phillips | 359/588 |
| 6,875,522 B2 | 4/2005 | Seto et al. | 428/611 |
| 7,005,178 B2 | 2/2006 | Bonkowski et al. | 428/156 |
| 7,006,294 B2 | 2/2006 | Steenblik et al. | 359/619 |
| 7,029,745 B2 | 4/2006 | Bonkowski et al. | 428/156 |
| 7,068,434 B2 | 6/2006 | Florczak et al. | 359/626 |
| 7,224,528 B2 | 5/2007 | Bonkowski et al. | 359/584 |
| 7,333,268 B2 | 2/2008 | Steenblik et al. | 359/619 |
| 2004/0239099 A1 | 12/2004 | Tompkin et al. | 283/74 |
| 2005/0127663 A1 | 6/2005 | Heim | 283/72 |
| 2007/0183047 A1 * | 8/2007 | Phillips et al. | 359/572 |
| 2007/0211238 A1 | 9/2007 | Hoffmuller et al. | 356/71 |
| 2007/0246932 A1 * | 10/2007 | Heine et al. | 283/94 |
| 2007/0279718 A1 * | 12/2007 | Einhorn et al. | 359/2 |
| 2008/0165423 A1 | 7/2008 | Steenblik et al. | 359/626 |
| 2008/0278816 A1 * | 11/2008 | Phillips et al. | 359/580 |
| 2008/0309063 A1 | 12/2008 | Zintzmeyer | 283/72 |

FOREIGN PATENT DOCUMENTS

| | | | |
|---|---|---|---|
| DE | 102005039113 | 2/2007 | B44F 1/12 |
| GB | 1517840 | 7/1978 | B42D 15/00 |
| JP | 2004191442 | 7/2005 | G02B 5/30 |
| WO | 97/21121 | 6/1997 | B42D 15/10 |
| WO | 99/36806 | 7/1999 | G02B 5/124 |
| WO | 0103945 | 1/2001 | B42D 15/10 |
| WO | WO 03061983 | 7/2003 | B42D 15/00 |
| WO | WO 2006018232 A1 * | 2/2006 | |
| WO | 2007/115648 | 10/2007 | B42D 15/00 |
| WO | 2008/050641 | 5/2008 | G02B 5/18 |

* cited by examiner

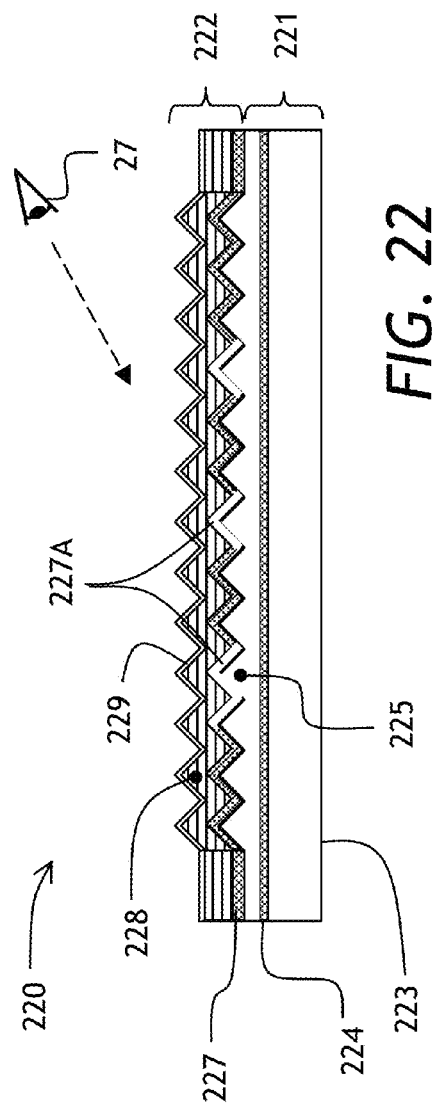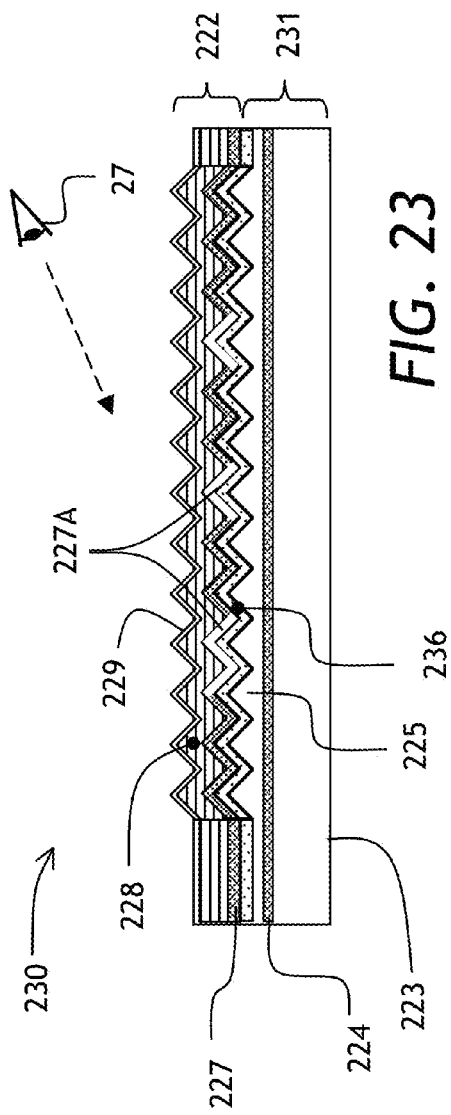

OPTICAL DEVICE EXHIBITING COLOR SHIFT UPON ROTATION

CROSS-REFERENCE TO RELATED APPLICATIONS

This application is a divisional of U.S. patent application Ser. No. 12/584,339, similarly titled, and filed on Sep. 3, 2009, which, in turn, claims priority to U.S. Patent Application No. 61/191,097, filed Sep. 5, 2008. All claims of priority to these applications are hereby made. These applications are hereby incorporated in their entireties by reference.

TECHNICAL FIELD

The present invention relates to optical devices exhibiting a change of perceived color upon changing an angle of illumination or angle of observation of the device, and in particular to optical devices that exhibit a color shift upon rotation of the device in its own plane relative to the observer.

BACKGROUND OF THE INVENTION

Color shifting pigments and colorants have been used in numerous applications, ranging from automobile paints to anti-counterfeiting inks for security documents and currency. Such pigments and colorants exhibit a property of changing color upon variation of an angle of incident light, or upon variation of a viewing angle of the observer. Color shifting pigments and foils are taught in U.S. Pat. No. 5,135,812 by Phillips et al., and color shifting polymeric stacks are taught in U.S. Pat. No. 6,797,366 by Hanson et al., both of which are incorporated herein by reference. Using color-shifting inks and foils in optical security devices is advantageous because they are difficult to counterfeit.

At present, many anti-counterfeiting devices include holograms and other diffractive optical devices. A dove image on a Visa credit card is one example of such a hologram. Diffractive security devices are taught in U.S. Pat. No. 5,825,547 by Lee, which is incorporated herein by reference. Unfortunately, the holographic devices can be counterfeited by shining a laser beam on the device and recording the diffracted image, or simply by mechanically replicating the holographic surface relief pattern.

Other types of micro-optic security devices are based on microlens arrays. These devices, providing a so called "floating image" effect, are taught in U.S. Pat. No. 7,333,268, U.S. Pat. No. 7,006,294, and US Patent Application Publication 2008/0165423, all by Steenblick et al., and U.S. Pat. No. 7,068,434 by Florczak et al., all of which are incorporated herein by reference. A major drawback of the microlens arrays devices for a banknote security application is that they tend to be thicker than required 1 mil, or 25 microns thickness. The device of Florczak, for instance, is about 2 mils, or 50 microns thick. Incorporating thick security devices into a banknote causes it to be slightly thicker on one end than on the other, which causes a stack of such banknotes to tilt towards one side, eventually causing the stack to fall. The color shifting optical security devices of this invention are generally free from the drawback of the increased thickness.

Color shifting foil and inks exhibit a shift of perceived color due to a phenomenon of light interference in thin films. Reflective thin film stacks are particularly useful as they exhibit high chromaticity at only a few thin film layers in the stack. When such a film is incorporated into an image of a printed document, the image changes color as the document is tilted back and forth. This phenomenon is observed because when the document is tilted, the light path differences in light reflecting from the various surfaces of the thin film optical stack change. These changes causes constructive and destructive light interference at different visible wavelengths. These spectral changes result in different colors to the human eye. When the document is rotated in its own plane, the observed color is constant and does not change because the angle of view of the image stays constant relative to the observer.

In U.S. Pat. No. 3,338,730 by Slade et al., which is incorporated herein by reference, a multi-hued reflective surface is disclosed. The multi-hued reflective surface is formed from a multiplicity of sharply defined regions, wherein the surface of each region has a plurality of parallel planes at an angle to the surface, the angles of the planes varying from region to region. The areas of the parallel planes and their positional angles in any one of the regions are different from that of the region or adjacent regions and are randomly oriented with respect to one another. To the viewer, one observes the surface as brilliant and multi-hued. Each region is coated with a reflective layer of aluminum, a spacer dielectric layer, and an optical metal (Ag, Cu or Au) to complete an optical interference filter. Each area is formed of grooves having a sawtooth-like cross section consisting of triangles or squares.

When the orientation of surface of Slade is changed, multi-hued changing colors are observed in those sharply defined regions that are larger than human eye resolution, which is about 100 microns. The regions that are less than 100 microns is size appear to have a uniform color that does not change upon rotation, because various colors would be integrated by the eye into a region of uniform color.

The prior art lacks an optical device that exhibits a controllable and identifiable change of color upon rotation of the device, for example a controlled rotation of a banknote or security document such as a passport or lottery ticket placed on a flat surface for an authenticity examination. Such a device is highly advantageous and desirable because it provides an easily identifiable and difficult to counterfeit security feature.

It is an object of this invention to utilize known color shifting coatings in a novel and inventive manner so as to produce an optical device which exhibits varying color by rotation of the device, for use in optical security and identification devices, as a decorative element, and for numerous other purposes.

SUMMARY OF THE INVENTION

In accordance with the invention there is provided an optical device exhibiting a shift of color upon rotation, comprising:

a substrate having an array of structures disposed thereon or therein, and a coating supported by the substrate and forming a color shifting reflector therewith;

wherein each of the structures of the substrate has first and second surfaces having a line of mutual intersection forming a non-zero angle with a plane of the substrate, wherein the first and the second surfaces each have a width and a length of more than 2 microns;

whereby the shift of color of the optical device is observable by rotating the optical device in the plane of the substrate.

Preferably, the width and the length of the first and the second surfaces are large enough, so that substantially no diffraction of visible light occurs.

In accordance with another aspect of the invention, there is further provided an optical device exhibiting a shift of color upon rotation, comprising:

a substrate having first and second areas having groove structures disposed on the substrate or in the substrate and running parallel to each other, the groove structures having a polygonal cross-section;

a coating supported by the substrate and forming a color shifting reflector therewith;

whereby the shift of color of the first and the second areas of the optical device is visibly different, so as to form indicia discernible by color, wherein the shift of color of the first or the second areas is observable by rotating the optical device in the plane of the substrate.

Preferably, a spacing between the grooves is large enough, so that substantially no diffraction of visible light occurs.

The coating can be disposed over the structures of the substrate, with a reflector layer thereof supported by the substrate or disposed on top of the coating. In the latter case, the color shifting is observable through the substrate. Alternatively, the coating can be disposed on a side of the substrate that is opposite to the side having the array of the structures, in which case the color shift is, again, observable through the substrate. To observe the color shift through the substrate, it has to be sufficiently transparent. The structures of the substrate are generally of a pyramidal shape, including tetrahedron pyramids, square pyramids, pentagonal pyramids, hexagonal pyramids, inverted pyramids, and frustum pyramids with flat tops, or they can be rod-shaped, the rods having polygonal cross sections.

In accordance with another aspect of the invention, the substrate has first and second areas shaped so as to form indicia discernible by color. Furthermore, the coating can have a transparent cover layer occupying at least a fraction of an area of the coating, wherein the color shift is visibly different in areas covered and not covered by the cover layer. The index of refraction of the transparent cover layer can be varied to produce additional indicia effects.

In accordance with another aspect of the invention, the substrate comprises a base layer, a planar reflector layer supported by the base layer, and an intermediate transparent layer supported by the planar reflector layer, wherein the coating is supported by the intermediate transparent layer of the substrate, and wherein the coating has a reflector layer having a plurality of voids therein arranged to form indicia discernible by color and observable at a first angle of rotation of the substrate in its own plane, when light propagates consecutively through the voids in the reflector layer, through the intermediate transparent layer, and is reflected by the planar reflector layer to propagate back through the layers in reversed order.

In accordance with another aspect of the invention, there is provided a method of manufacturing the optical device of the invention, comprising:

(a) providing an embossing tool having an embossing surface having a first plurality of parallel grooves and a second plurality of parallel grooves running at an angle to the first plurality of parallel grooves;

(b) providing a blank substrate for texturing;

(c) making an embossing of the blank substrate with the embossing tool;

(d) coating the substrate embossed in (c) with the coating forming the color shifting reflector therewith.

In accordance with another aspect of the invention, there is further provided a banknote having an optical device of the present invention incorporated therein.

In general, the present invention envisions using the above described optical devices in optical security devices for a document. Herein, a "document" means any valuable document such as a passport, a lottery ticket, a token, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Exemplary embodiments will now be described in conjunction with the drawings, in which:

FIG. 22 is a cross-sectional view of an embodiment of an optical device of the present invention exhibiting a "flash of color" effect; and FIG. 23 is a cross-sectional view of another embodiment of an optical device of the present invention exhibiting a "flash of color" effect.

DETAILED DESCRIPTION OF THE INVENTION

While the present teachings are described in conjunction with various embodiments and examples, it is not intended that the present teachings be limited to such embodiments. On the contrary, the present teachings encompass various alternatives, modifications and equivalents, as will be appreciated by those of skill in the art.

Figure 1A:
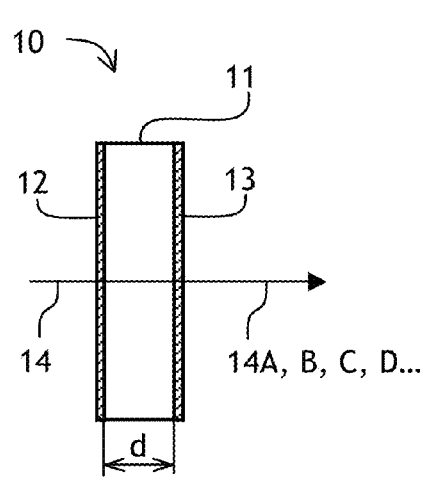
FIGS. 1A and 1B are side views of a prior-art thin-film interference filter.
Figure 1B:
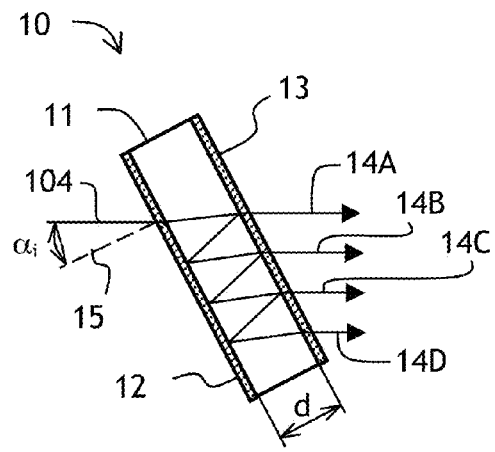

Referring to FIG. 1A, a prior-art thin film interference filter 10 is shown having a transparent layer 11 of thickness d sandwiched between partial reflectors 12 and 13. An incoming multi-color optical beam 14, upon multiple reflections between the partial reflectors 12 and 13, exits the thin film interference filter 10 as beams 14A, 14B, 14C, 14D . . . , which interfere constructively or destructively, depending on ratio of wavelength to the optical path length within the transparent layer 11, which in this case is equal to thickness d of the transparent layer 11 multiplied by index of refraction of the transparent layer 11. Turning now to FIG. 1B, the thin film interference filter 10 is tilted with respect to the beam 14, resulting in a non-zero angle of incidence $\alpha_i$ to a normal 15. Optical path length difference between the beams 14A to 14D increases, whereby a color of the output beam comprising the beams 14A to 14D changes.

Figure 2:
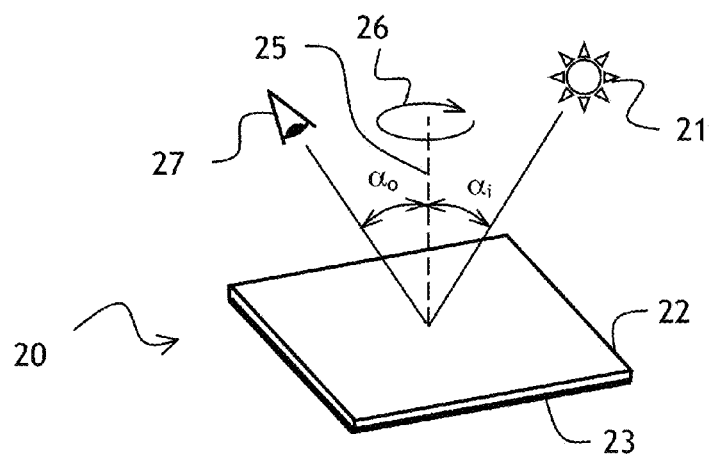
FIG. 2 is an isometric view of a prior-art color shifting foil rotated in its own plane.

Referring now to FIG. 2, an isometric view of a prior-art color-shifting foil 20 is shown. The color shifting foil 20 has a 100% reflector 23 coated with a coating 22. The coating 22 is based on the thin film interference filter 10 of FIG. 1, except it has only one partially reflecting, partially absorbing layer on top of the coating 22. When the angle of observation $\alpha_o$ changes, the color-shifting foil 20 changes its apparent color. However, upon rotating the foil 20 in its on plane, that is, about an axis 25, as shown with an arrow 26, the angle of incidence $\alpha_i$ of light from a multi-colored light source 21 and the angle of observation $\alpha_o$ do not change. Therefore, the color visible by an observer's eye 27 will not change. Thus, the prior-art color-shifting foil 20 based on the thin film interference stack 10 does not exhibit color by rotation.

It has been discovered that a surface embossed with a micro-relief structure having a feature size below human eye resolution but large enough not to exhibit diffraction effects at wavelengths of visible light, coated with a color-shifting coating, exhibits a uniform color, shifting to another color as the surface is rotated in its own plane. This effect of color shift by rotation, as well as devices exhibiting the effect of color shift by rotation, will now be described in detail.

Figure 3:
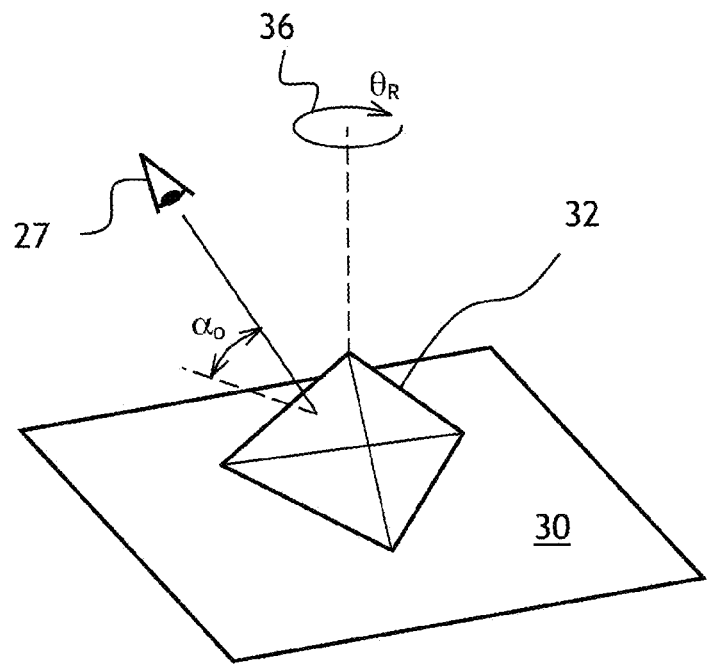
FIG. 3 is an isometric view of a textured substrate of the present invention.

Turning to FIG. 3, an isometric view of a substrate 30 of the present invention is shown. The substrate 30 is textured, that is, the substrate 30 has an array of structures formed thereon or therein. One of the structures, a structure 32, is shown greatly magnified in FIG. 3. The structure 32, in this embodiment, is a trihedral pyramid. The structure 32, as well as other structures, not shown, is coated with a coating forming a color shifting reflector with the substrate 30. The coating can have an opaque reflector layer, a partially reflecting absorber layer, and a dielectric layer in between, or it can have only one, outer partially reflecting absorber layer disposed over the dielectric layer when the substrate 30 itself, including the structure 32, is reflective. It can be seen from FIG. 3 that rotating the substrate 30 in its own plane as shown by an arrow 36 results in a change of an angle of observation $\alpha_o$ by the observer's eye 27, whereby color shift by rotation is observed. Preferably, the structures 32 are larger than 2 microns but smaller than 100 microns in size, so the eye 27 does not distinguish between neighboring structures while observing the color by rotation effect.

Figure 4:
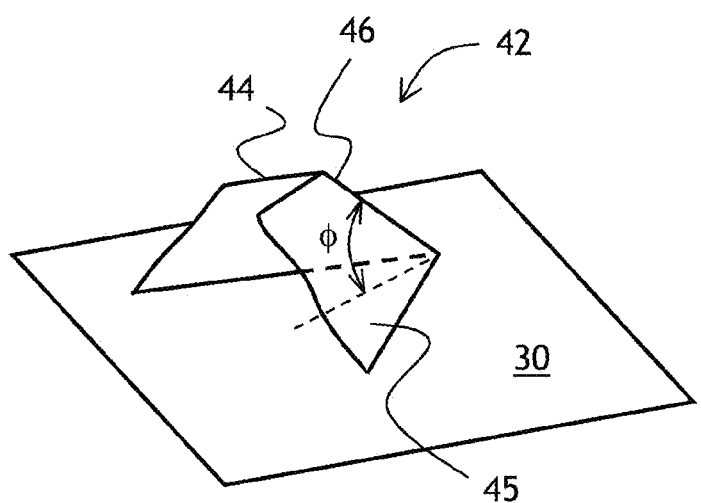
FIG. 4 is an isometric view of two surfaces of the textured substrate of FIG. 3, having a line of mutual intersection forming a non-zero angle with a plane of the substrate.

Referring now to FIG. 4, an isometric view of a fraction 42 of the structure 32 of FIG. 3 is shown, having two surfaces 44 and 45 having a line of mutual intersection 46 forming a non-zero angle $\phi$ with the plane of the substrate 30. A structure of the present invention, no matter how many sides, will have at least two surfaces similar to the surfaces 44 and 45 crossing at the line 46 forming the non-zero angle $\phi$ with the plane of the substrate 30. The more sides a structure has, the less rotation will be required to exhibit a full color shift given by a particular coating of the structure, and the more full color shifts will be observed upon a complete turn, or 360 degrees of rotation of the substrate 30.

Figure 5:
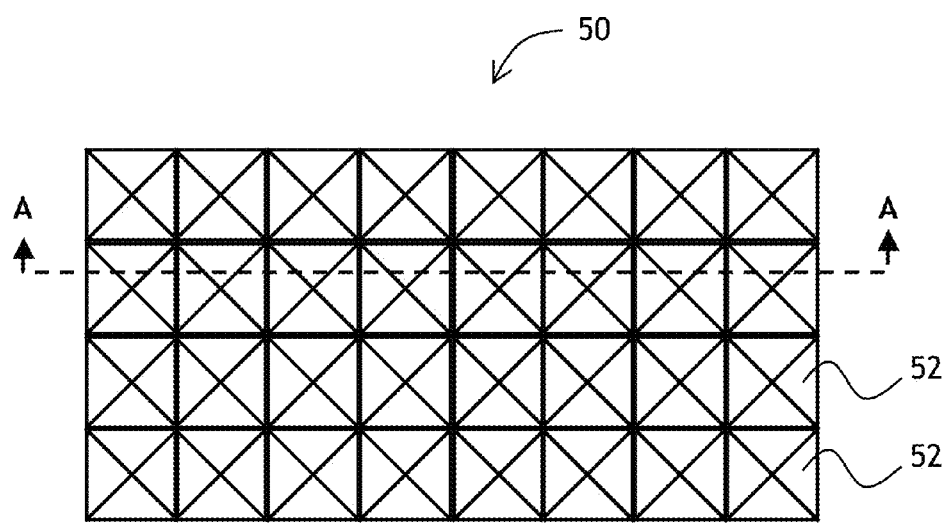
FIG. 5 is a top view of an optical device exhibiting a color shift upon rotation.
Figure 6:
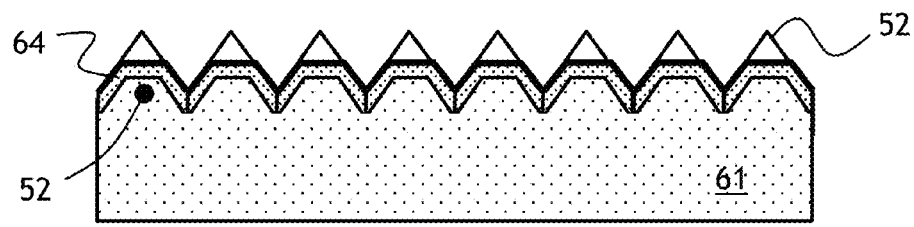
FIG. 6 is a cross-sectional view of the optical device of FIG. 5 taken along lines A-A in FIG. 5.

Turning to FIG. 5, a top view of an optical device 50 exhibiting a color shift upon rotation is shown. The optical device 50 has square reflective pyramids 52 arranged into rectangular arrays. Referring to FIG. 6, a cross-sectional view of the optical device 50 of FIG. 5 is shown. The cross-section is taken along a line A-A in FIG. 5. The reflective pyramids 52 are a part of a textured substrate 61, which is coated with a coating 64 exhibiting a color shifting property when deposited onto the textured substrate 61. The coating 64 has a substantially uniform thickness, conforming to the pyramidal textured shape of the textured substrate 61. The color shift upon rotation is observed because when the textured substrate 61 is rotated in its own plane, the local angle of observation $\alpha_o$ changes as shown in FIG. 3 and explained above. Changing the local angle of observation $\alpha_o$ results in a change of perceived color of the color shifting coating 64. The coating 64 has an opaque reflector layer, an absorber layer, and a dielectric layer therebetween. In one embodiment, the coating 64 includes an absorber layer and a dielectric layer, the textured substrate 61 itself functioning as an opaque reflector layer, so as to form a color shifting reflector with the textured substrate 61.

Pyramids having more than three top faces, including square pyramids, pentagonal pyramids, hexagonal pyramids, inverted pyramids, and frustum pyramids with flat tops can be used in the textured substrates 30 of FIG. 3 and 61 of FIG. 6. Furthermore, other shapes, such as rod structures extending from the substrate or inverted rod structures, or voids extending into the substrate, having polygonal cross sections, are also usable. Pyramid heights of between 2 microns and 100 microns are preferably used. Base widths on less than 100 microns and preferably less than 10 microns are desirable for compatibility with windowed bank note threads. For hot stamp devices, the minimum base width is about 20 microns, and the corresponding pyramid heights are between 12 and 24 microns. Pyramid faces correspond to the surfaces 44 and 45 of FIG. 4. The size, that is, the width and the length of the surfaces 44 and 45, is generally larger than 2 microns. Pyramids with base widths of more than 100 microns will be discernible by a naked eye. Due to the size of the faces of the pyramids, the diffraction effects are insignificant, and the devices of the present invention exhibit color by rotation due to physical phenomena of reflection and, or refraction, as opposed to color change due to diffraction. A diffraction-caused color shift is observable in diffractive devices taught in U.S. Pat. Nos. 7,029,745; 7,005,178; and 6,761,959 by Bonkowski et al. and assigned to JDS Uniphase Corporation, all of which are incorporated herein by reference.

Figure 7:
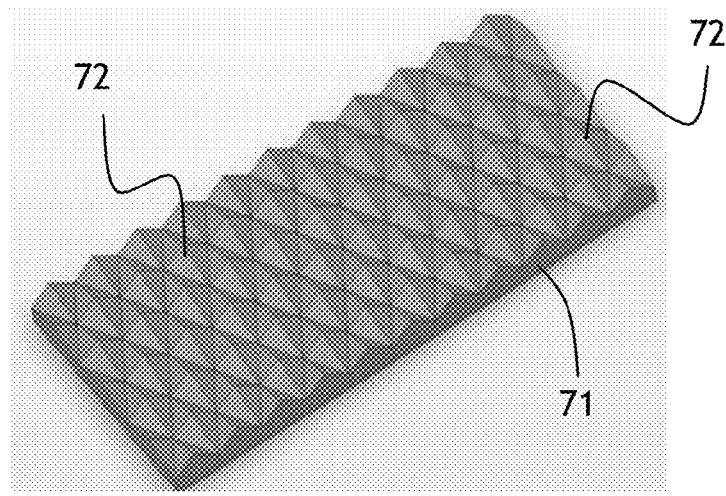
FIG. 7 is a three-dimensional view of an embodiment of the textured substrate having rhomboid structures.

Pyramids can also be rhomboidal. Referring now to FIG. 7, a three-dimensional view of a textured substrate 71 having rhomboid structures 72 is shown. Conveniently, the structures 72 can be manufactured using an embossing tool with an embossing surface having a plurality of grooves running parallel to each other. Using this method, a first embossing of a reflector is made, then the embossing tool is rotated by a pre-defined angle about an axis perpendicular to the embossing surface, and then a second embossing is made. At the first embossing, the surfaces 44 of FIG. 4 are produced; and at the second embossing, the surfaces 45 are produced. In one embodiment, an acrylic or polyvinyl chloride (PVC) or polyethylene terephthalate (PET) type G substrate is embossed with the embossing tool, and the embossed surface is coated with a color shifting optical coating. Furthermore, an all dielectric color shift coating, having pairs of low and high index dielectric interference layers, can be used.

Figure 8:
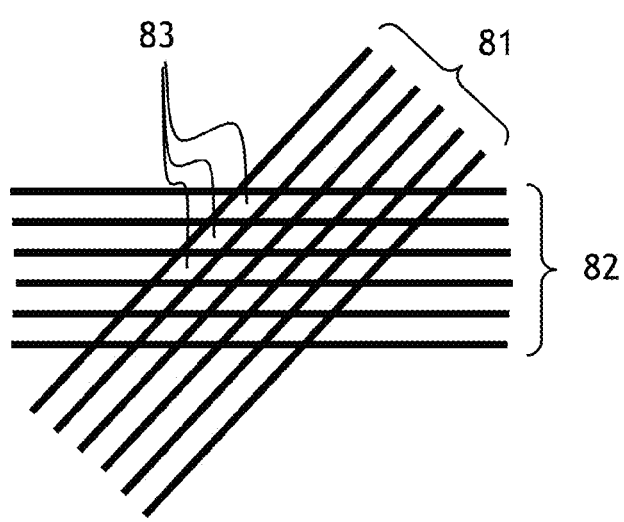
FIG. 8 is a diagram showing two orientations of an embossing tool for manufacturing the textured substrate of FIG. 7.

Turning now to FIG. 8, the two embossings are symbolically shown with sets of lines 81 and 82, rhomboidal structures visibly appearing at 83. The textured reflector 71 can also be produced using a single embossing with an embossing tool created using diamond turned dual groove structure represented by the lines 81 and 82.

Figure 9A:
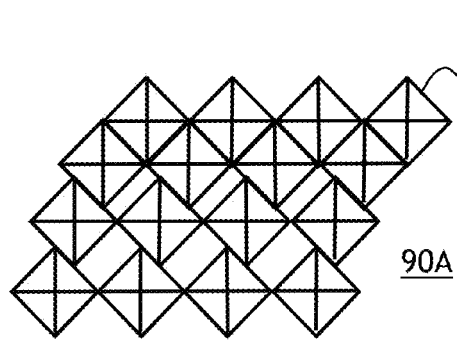
FIGS. 9A to 9D are plan views of various shapes and orientations of structures of textured substrates of the present invention.
Figure 9B:
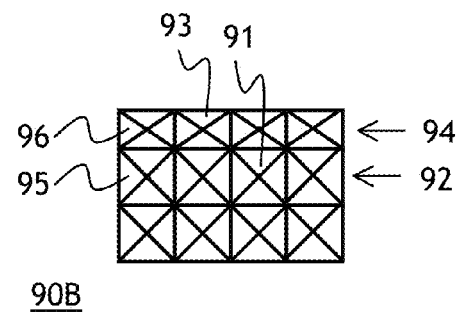
Figure 9C:
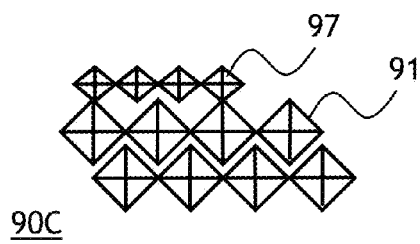
Figure 9D:
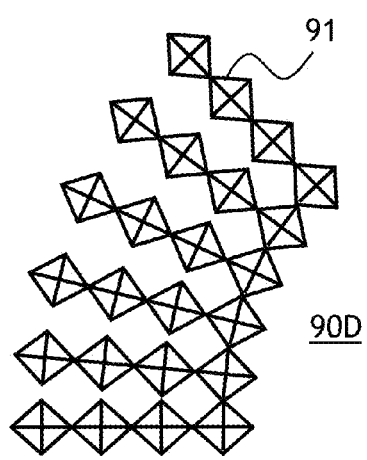
Figure 9E:
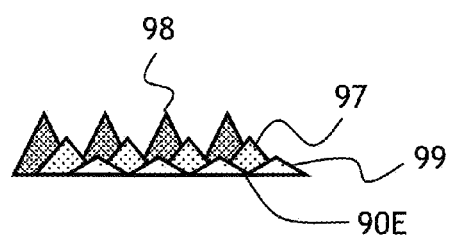
FIG. 9E is a side view of structures of a textured substrate of the present invention showing pyramidal structures of different height.

Referring to FIGS. 9A to 9E, views of various shapes and orientations of structures of textured substrates 90A to 90E are shown, respectively. In FIGS. 9A to 9E, the structure of a substrate is spatially modulated, so as to create visible indicia discernible by color. For example, in the textured substrate 90A shown in FIG. 9A, pyramids 91 are offset in each row relative to one another. In the textured substrate 90B shown in FIG. 9B, the pyramids 91 in a row 92 are wider than pyramids 93 in a row 94, even though the angles between the faces 95 and 96 of the pyramids 91 and 93, respectively, and a plane of the substrate 90B, are the same. Of course, face angles can be made dependent on the pyramid height. The textured substrate 90C shown in FIG. 9C has pyramids 91 and 97 of different size and array pitch. In FIG. 3D, the textured substrate 90D has the pyramids 91 arranged in an arc pattern. In FIG. 9E, the pyramids 97, 98, and 99 of the textured substrate 90E are of different height. Different types of pyramids can be present in different areas of a textured reflector, to obtain areas differing by perceived color.

Figure 10:
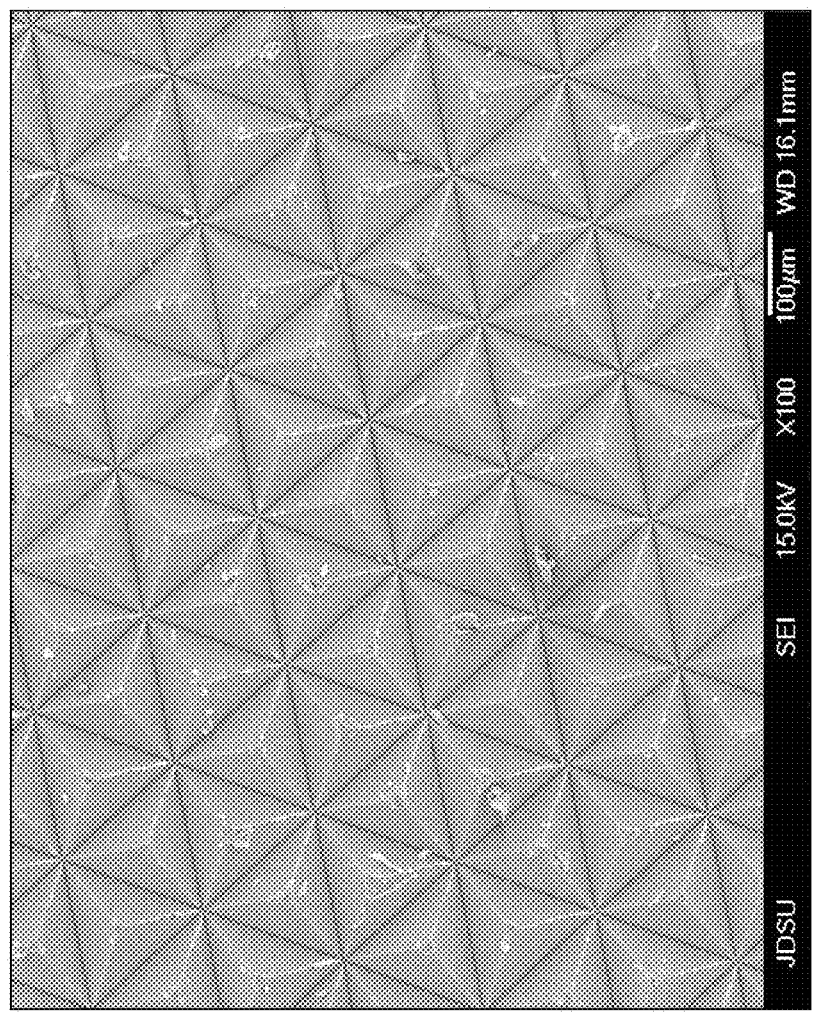
FIG. 10 is an electron microscope image of trihedral pyramidal structures on a top surface of a substrate.

Referring now to FIG. 10, a scanning electron microscope (SEM) image of symmetrical trihedral pyramidal structures of a textured substrate of the present invention is presented. Light microscope and SEM images of one of the pyramidal structures show an equilateral triangular base measuring about 180 microns per side. A measurement using a WYKO™ interferometer by VEECO, Tucson, Ariz., USA, yielded a peak-to-base distance of about 75 microns. In practice, the height of 2 to 10 microns will work. A reduced height is important because it allows one to keep the total thickness of an optical security device below the required 25 microns for banknote security features. An optical device that thin can be used in a security hot stamp, a windowed thread, and in a laminated or label optical security product.

The substrates shown in FIGS. 3 to 7, FIGS. 9A to 9E, and FIG. 10 are preferably uniformly coated with a multilayer thin-film interference stack constructed to achieve a desired color shift according to methods known in the art. The following multilayer stacks are preferably used:

R/D/Ab, Ab/D/Ab, R/D/Ab/D/Ab, Ab/D/R/M/R, D/C/D/C/D, (HL)x or (LH)x, wherein R denotes a reflective metal layer, which can be semi-transparent or completely opaque, D denotes a transparent or colored dielectric layer, Ab denotes an absorber layer, that is, a semi-transmitting layer wherein the coefficients of refraction and absorption n and k are of near equal magnitude, C refers to a carbon layer, H refers to a high-index dielectric layer, typically over 1.65, L refers to a low-index dielectric layer, typically less than 1.65, and M refers to a magnetic layer. The sign "x" after parentheses refers to repeating the structure in the parentheses x times. High index layers are generally based on $TiO_2$, ZnS or $Ta_2O_5$ whereas the low index layers are based on $MgF_2$ or $SiO_2$. The layer order may be reversed depending on how the structured surface will be viewed. The reflector layer could also serve as the magnetic layer. For example, a nickel reflector layer could be used. A more detailed description of these stacks can be found in U.S. Pat. Nos. 5,135,812; 5,214,530; 5,571,624; and 6,833,959, all of which are incorporated herein by reference. The magnetic layer can be disposed either over or under the reflective layer, or between two reflective layers. The magnetic layer provides an additional degree of security.

Preferably, the substrates shown in FIGS. 3 to 7, FIGS. 9A to 9E, and FIG. 10 are coated with a color-shifting thin-film interference coating having an opaque aluminum reflector layer, a spacer, or dielectric layer of $MgF_2$, and an absorber layer of Cr. The textured substrates of FIGS. 3 to 7, FIGS. 9A to 9E, and FIG. 10 are called herein "macro-structural relief" substrates because optical diffraction effects from these structures are insignificant due to the size of the structure exceeding 2 microns. When the structure is coated uniformly, that is, when all surfaces are coated with the same thickness of layers, a surprising effect appears when the sample is rotated in its own plane: a dramatic change in color is observed. This is a particularly desirable feature since it allows the viewer to see a color shift with just a flick of the wrist as might be seen in throwing down a casino chip or a playing card. Color uniformity can be achieved in a vacuum chamber if the sample is coated at a direct line-of-sight, or by multi-angle coating which averages out the coating thicknesses. One can get uniform or non-uniform coatings on textured surfaces depending upon the deposition technique and the material and shape of the textured substrate.

For a relief that has different face angles, vacuum coating at a direct line of sight will result in surfaces having different thicknesses. One can compensate for the highest angles encountered to make sure the reflector is opaque at those angles, although this requirement is not necessary. Varying thicknesses of the layers of the coating will also result in the desired outcome, that is, color by rotation will be observed. For the spacer layer and for the absorber layer, various thicknesses will be achieved and color by rotation will result.

If the sample is coated at an angle to the substrate of less than 90 degrees, then the relief structures can be coated asymmetrically as more coating arrives at one side of the relief than the other since the front faces shield the back side of the relief. This, too, will result in observable color by rotation. Furthermore, in cases when the coating is performed at an acute angle, the surfaces of the structures do not need to be planar. For example, a collection of hemispherical domes can exhibit a color by rotation effect, provided that the deposition source geometry is such that different dielectric thicknesses are obtained at different angles of rotation. In this case, even a randomized bumpy surface can produce a color by rotation effect.

Figure 11:
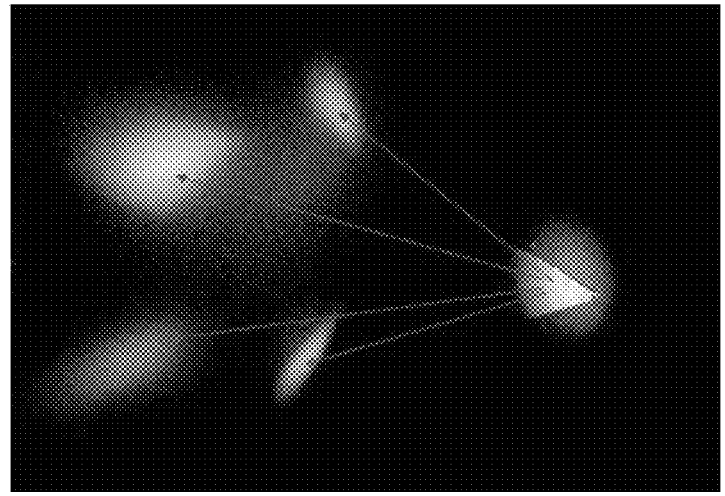
FIG. 11 is a photograph showing multi-colored light scattering by an optical element using the substrate of FIG. 10 and exhibiting color upon rotation.

Referring now to FIG. 11, a photograph showing multi-colored light reflected by an optical device having the substrate of FIG. 10 coated with a single-cavity interference coating of Al/$MgF_2$/Cr is presented. A point source of white light was used to illuminate the sample. The different colors are due to color-upon-rotation effect and also due to colorupon-tilting effect. One can see that light beams at different colors are reflected at different angles.

Figure 12:
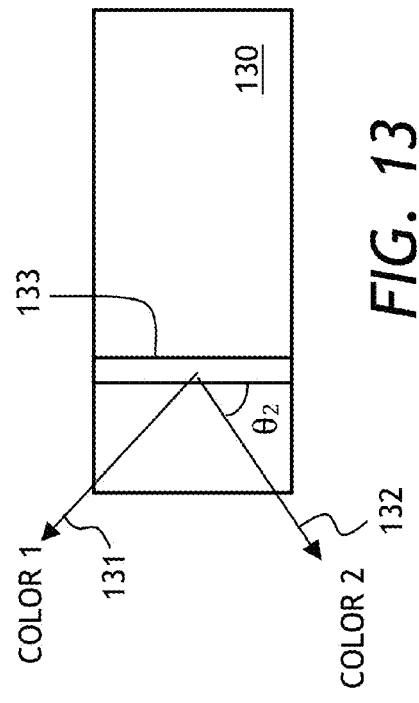
FIGS. 12 and 13 are plan view diagrams of a security feature on a banknote showing directions associated with observable colors of the security feature.
Figure 13:
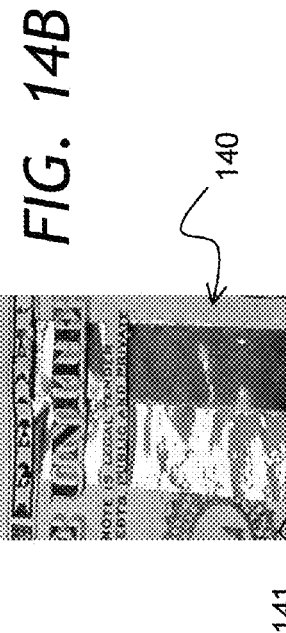

Turning now to FIG. 12, a plan view diagram of a security feature 123 on a banknote 120 is presented showing directions associated with observable pre-defined colors of the security feature 123. The surfaces are oriented so that a first color (COLOR 1) is observed at directions 121 along the banknote 120, and a second color (COLOR 2) is observed at directions 122 across the banknote 120, the directions 122 forming an angle $\theta_1$=90 degrees with respect to the length direction of the security feature 123. Turning to FIG. 13, a plan view diagram of a security feature 133 on a banknote 130 are presented showing directions associated with observable colors of the security feature 133. The banknote 130 of FIG. 13 has a different denomination than the banknote 120 of FIG. 12. In FIG. 13, the surfaces are oriented so that the COLOR 1 is observed at a direction 131 at +45 degrees to the banknote 130, and the COLOR 2 is observed at a direction 132 at −45 degrees to the banknote 130, the directions 132 forming an angle $\theta_2$=45 degrees with respect to the length direction of the security feature 133. Thus, the denominations of the banknotes 120 and 130 can be verified by a pre-determined, banknote denomination-dependent color shift upon rotation.

Optical security devices of the present invention are preferably constructed with textured and flat reflectors exhibiting color-by-rotation and color-by-tilt, respectively. The area having a flat reflector provides a reference color for comparison with the color of the area having a textured reflector. These two areas can have a same thickness of color shifting coating. Alternatively, the color-shifting coating thicknesses of these two areas can be different, so as to provide a different background color if required.

Figure 14A:
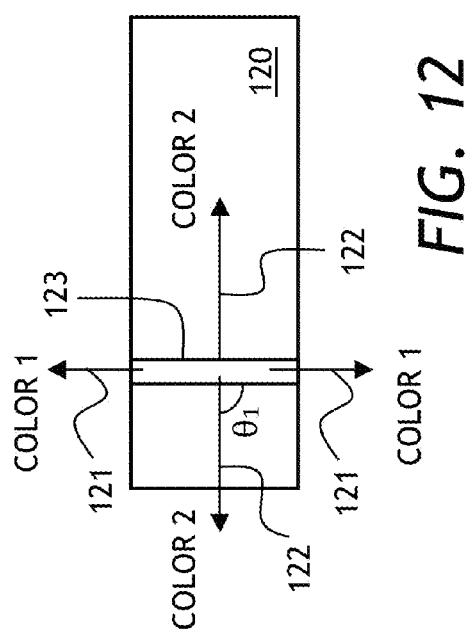
FIGS. 14A and 14B are photographs of one US dollar banknote having security devices of the present invention superimposed thereupon for purposes of illustration.
Figure 14B:
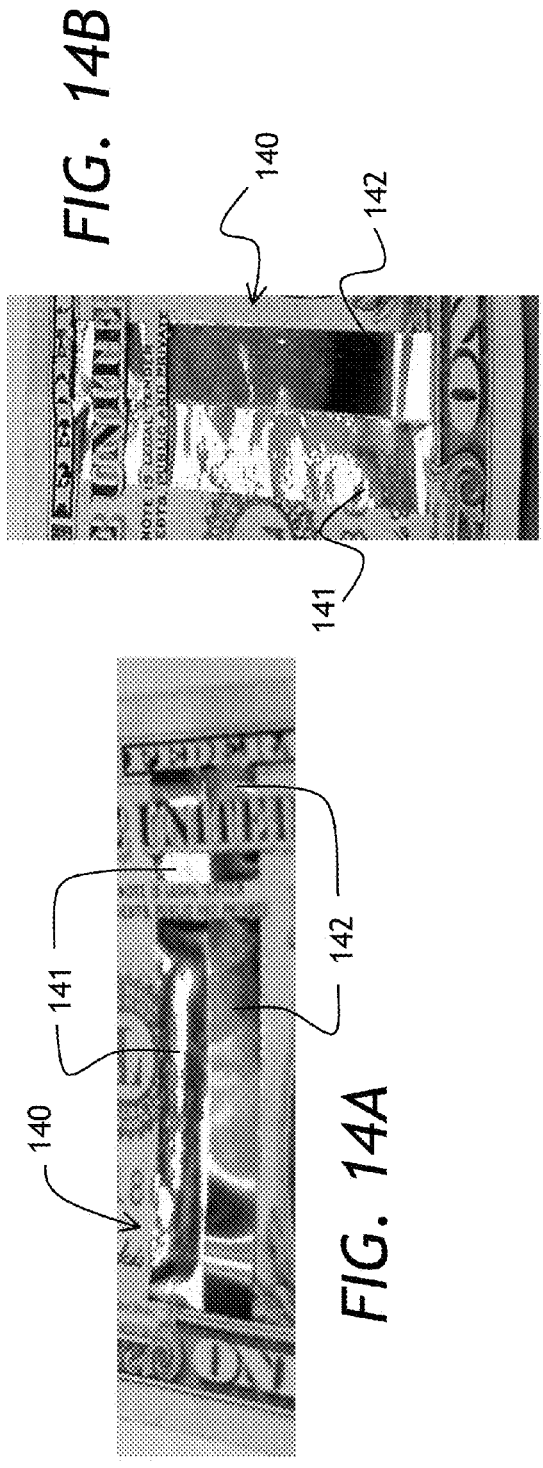
Figure 15A:
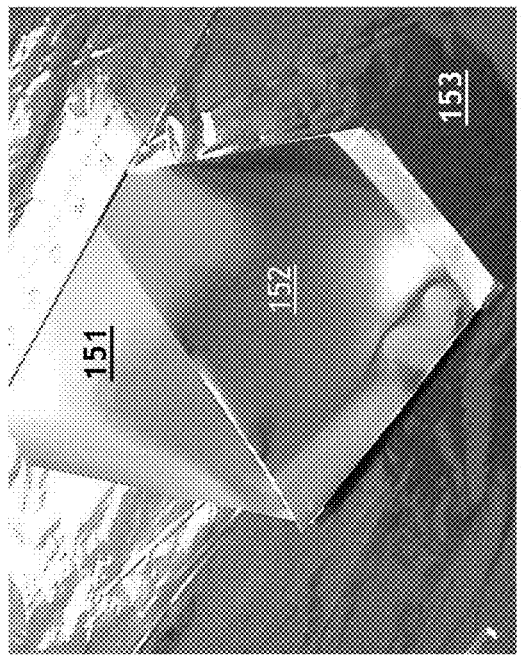
FIGS. 15A to 15D are photographs of optical devices exhibiting color shift upon rotation on the background of an optical device based on a Fabry Perot color shifting foil exhibiting no color shift upon rotation, different Figures corresponding to different angles of rotation.
Figure 15B:
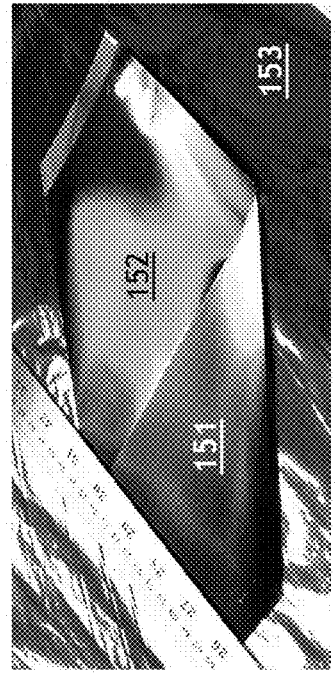
Figure 15C:
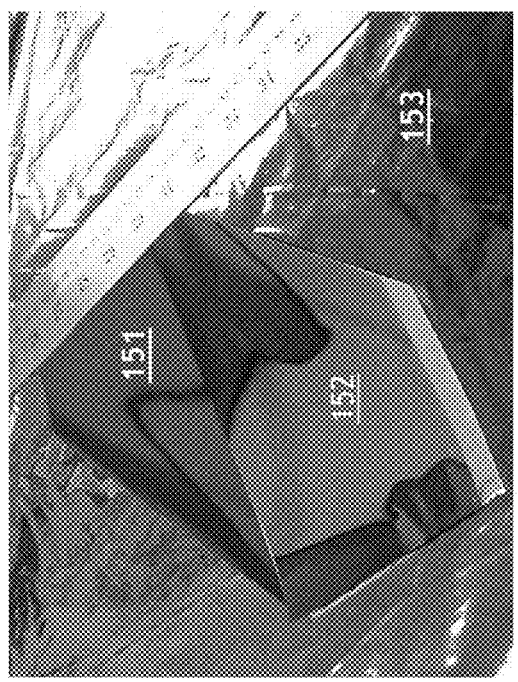
Figure 15D:
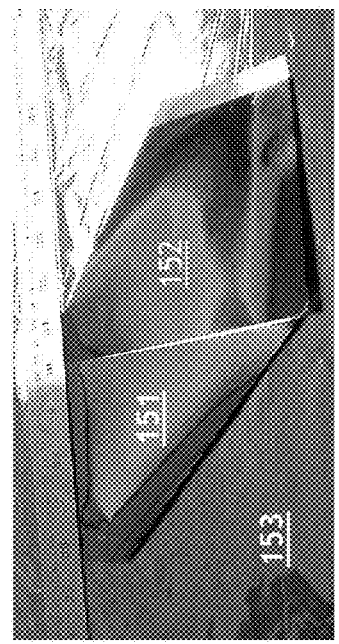

Referring to FIGS. 14A and 14B, photographs of one US dollar banknote are presented. The banknote has a security device 140 superimposed thereupon for illustration purposes. The security device 140 has two areas, 141 and 142. The area 141 has a flat reflector, and the area 142 has a reflector textured with parallel grooves. In FIG. 14A, the viewing direction is along the banknote. At this angle, both areas 141 and 142 exhibit the same magenta color. In FIG. 14B, the viewing direction is across the banknote. At this angle, the area 141 has magenta color because it has a flat reflector and the local viewing angle $\alpha_o$, corresponding to the angle $\alpha_o$ in FIG. 2, has not changed upon rotating the banknote. The area 142 exhibits green color in FIG. 14B because it has a textured reflector and the area 142 exhibits the phenomenon of color-by-rotation, because the local viewing angle $\alpha_o$ in FIG. 3 has changed.

Turning now to FIGS. 15A to 15D, photographs of optical devices 151 and 152 exhibiting color shift upon rotation on the background of an optical device 153 exhibiting no color shift upon rotation are presented. The devices 151 and 152 have a substrate textured with parallel grooves, while the substrate of the device 153 is flat. FIGS. 15A to 15D correspond to different angles of rotation, the devices 151, 152, and 153 being rotated counterclockwise in going from FIG. 15A to FIG. 15D. One can see that the device 151 changes color from red in FIG. 15A to yellow in FIG. 15B to green in FIG. 15C to brown in FIG. 15D, and the device 152 changes color from green in FIG. 15A to light-green in FIG. 15B to red-brown in FIG. 15C to blue-green "seawater" color in FIG. 15D. The optical device 153, although being rotated together with the optical devices 151 and 152, does not undergo a substantial color shift upon rotation, in going from FIG. 15A to 15D, even though the optical device 153 has a color shifting coating.

Figure 16A:
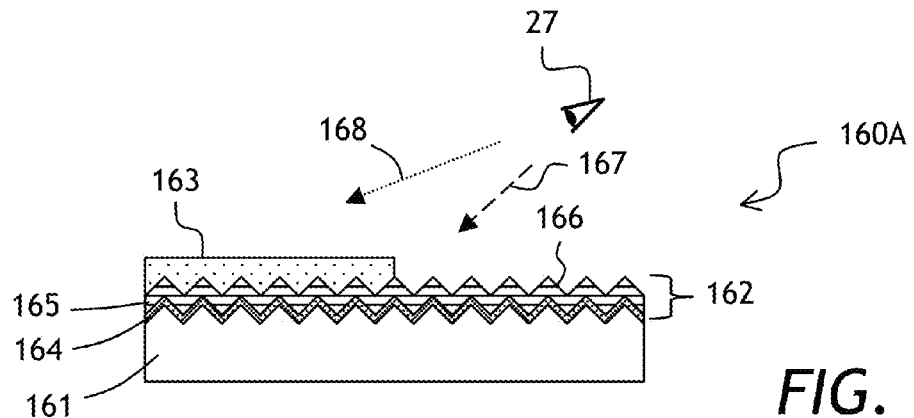
FIGS. 16A to 16C are cross-sectional views of three different embodiments of an optical device of the present invention.
Figure 16B:
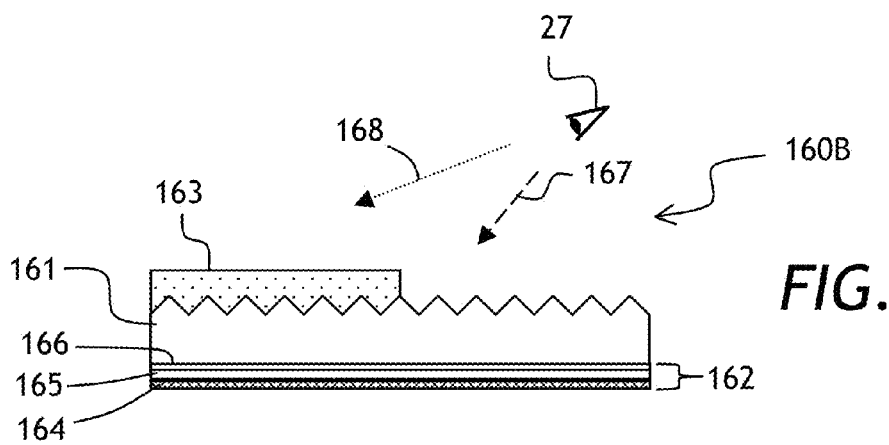
Figure 16C:
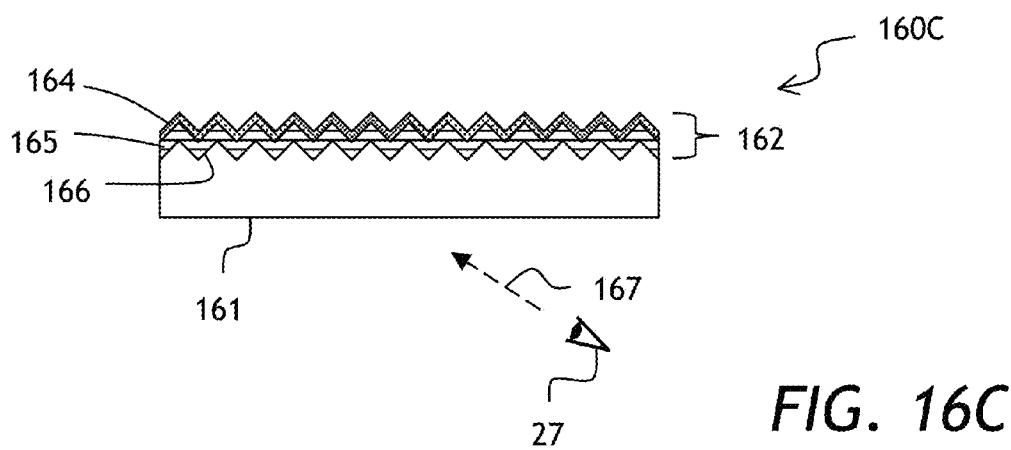

Referring now to FIGS. 16A to 16C, cross-sectional views of three different embodiments of an optical device of the invention are shown, exhibiting color shift upon rotation. Devices 160A, 160B, and 160C of FIGS. 16A, 16B, and 16C, respectively, have a substrate 161 and a color shifting coating 162 supported by the substrate 161. The devices 160A and 160B also have a transparent cover layer 163. The color shifting coating 162 has an opaque reflector layer 164, a dielectric layer 165, and a partially reflecting absorber layer 166. The substrate 161 is textured with pyramidal structures, similar to the substrate 30 having structures 42 in FIG. 3.

In the device 160A of FIG. 16A, the opaque reflector layer 164 of the color shifting coating 162 is disposed adjacent the substrate 161. The cover layer 163 is supported by the color shifting coating 163. The color shift is visibly different in areas covered and not covered by the cover layer 163, as is indicated by dashed and dotted lines 167 and 168, respectively, symbolizing lines of sight of the observer's eye 27.

In the device 160B of FIG. 16B, the color shifting coating 162 is disposed on a flat side of the substrate 161 that is opposite to a textured side having the array of structures, and the cover layer 163 is supported by the textured side of the substrate 161. The cover layer 163 occupies at least a fraction of an area of the flat side of the substrate, wherein the color shift is visibly different in areas covered and not covered by the cover layer 163. This is indicated by dashed and dotted lines 167 and 168, respectively, symbolizing lines of sight of the observer's eye 27. The substrate 161 is sufficiently transparent for the color shift to be observable therethrough.

The cover layer 163 in the optical devices 160A and 160B of FIGS. 16A and 16B is preferably patterned so as to form indicia discernible by color. Further, preferably, the cover layer 163 is an ink containing high-index nanoparticles such as $TiO_2$ nanoparticles, printed over the color shifting coating. The indicia may contain words, symbols, bar codes, numbers, or any other recognizable shape seen against a background.

In the device 160C of FIG. 16C, the opaque reflector layer 164 is disposed on top of the color shifting coating 162, whereby the color shift by rotation is observable through the substrate as shown by the viewer's eye 27 having line of sight 167. Of course, the substrate 161 of the devices 160B and 160C of FIGS. 16B and 16C has to be sufficiently transparent for the color shift to be observable therethrough.

In the devices 160A, 160B, and 160C, the color shifting coating 162 can be a single-cavity thin film interference coating, a multi-cavity thin film interference coating, or a color-shifting paint having thin film interference coating flakes suspended therein. For those devices that have the color-shifting paint disposed over the structures, the latter has to be larger than a size of the coating flakes, which is typically 10 to 20 microns. The color-shifting paint itself may be printed to form indicia. In one embodiment of the invention, not shown, the thin-film interference coating has two dielectric layers 165 disposed on both sides of the reflector layer 164, so that color-by-rotation effect is observable from both sides of the optical device 160A or 160C. In the optical device 160B, the color by rotation can only be seen by viewing though the transparent substrate. In the optical devices 160A and 160B, the cover layer 163 fills the structures, so the areas covered by the cover layer 163, no color by rotation, only color by tilt will be observed by the observer's eye 27. Furthermore, a microlens array supported by the substrate and optically coupled to the color shifting layer can be used to predictably modify the local viewing angle of the color shifting layer, thereby forming indicia discernible by color, the color shifting upon rotation of the substrate.

Figure 17A:
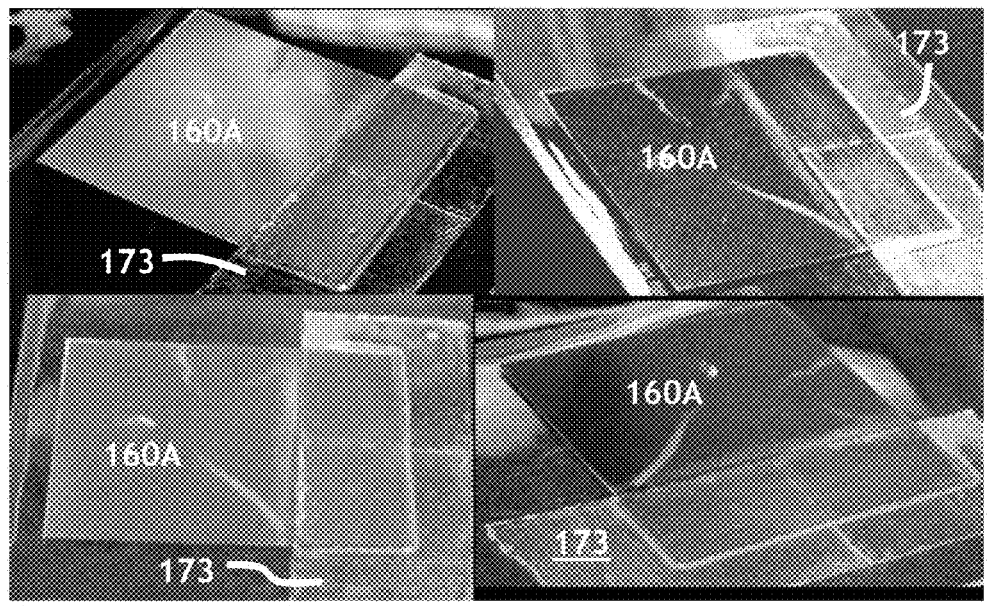
FIGS. 17A and 17B are photographs of samples of the optical devices of FIGS. 16A and 16B, respectively.
Figure 17B:
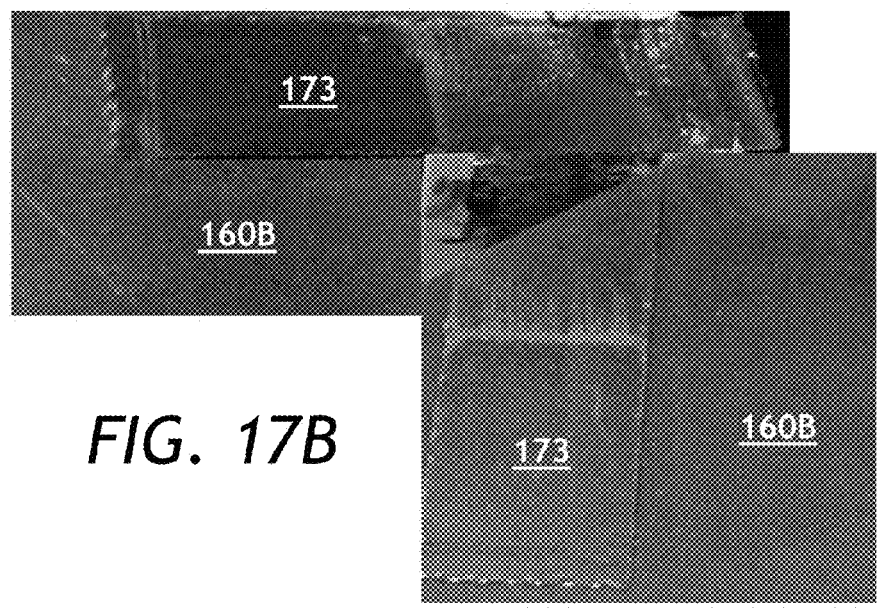

Turning to FIGS. 17A and 17B, photographs of samples of the optical devices 160A of FIG. 16A and 160B of FIG. 16B are shown, respectively. In both cases, a piece of a clear cellophane adhesive tape 173 was used in place of the cover layer 163. Four photographs seen in FIG. 17A were taken at different angles of rotation. It is seen that areas covered and uncovered with the adhesive tape 173 in FIG. 17A exhibit visibly different color by rotation effect. Two photographs seen in FIG. 17B were also taken at different angles of rotation. It is seen that areas covered and uncovered with the adhesive tape 173 in FIG. 17B exhibit visibly different color effects, the uncovered areas exhibiting color by rotation, and the covered areas exhibiting color by tilting effect, because the color of the covered area stays substantially the same (blue). Slight change of blue color tint seen in FIG. 17B is most likely due to a change of viewing angle observed upon rotation, as the area covered by the tape 173 moved closer to the observer upon rotation, which slightly changed the viewing angle.

It has been found that the color by rotation effect gives surprising bright colors not only with specular light but with diffuse light as well. The fact that the color by rotation effect is observable with diffuse illumination is important. A diffused light source, for example a fluorescent lamp, is a typical source of illumination that one would expect to have in a retail store during visual inspection of banknotes at the cashier's station.

It has been observed that by roughening the textured substrate surface, for example by exposing the substrate surface to an etchant for a matte finish of the substrate, new interesting color effects are produced. When the substrate 30 having surfaces 44 and 45 of FIG. 4, or the substrate 61 of FIG. 6, or the substrate 71 of FIG. 7, or the substrates 90A to 90E of FIGS. 9A to 9E, or the substrate 161 of FIGS. 16A to 16C is roughened and subsequently used to produce a color-by-rotation optical device as described herein, the observed colors tend to tone down to more subdued hues as in a pastel colors. This makes an optical device of the present invention even more difficult to counterfeit.

Figure 18:
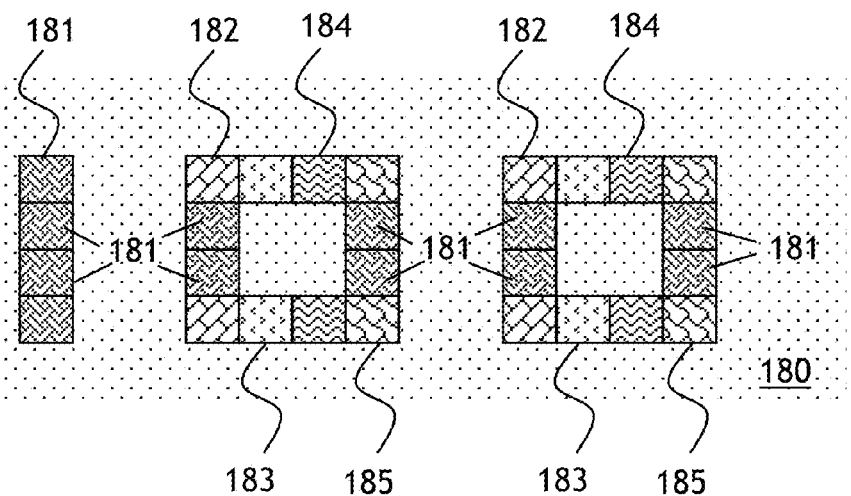
FIG. 18 is a plan schematic view of a one hundred-dollar banknote denomination exhibiting color variation upon rotation of the banknote.

By combining different areas exhibiting different color by rotation effects, one can obtain security features that are useful for optical identification purposes, produce bright and pleasant colors, while being difficult to counterfeit. Referring to FIG. 18, a plan schematic view of a hundred-dollar banknote 180 is shown. The banknote 180 has the indicia "100" manufactured using a combination of areas 181 to 185 exhibiting different color variation upon rotation of the banknote 180, on a background that only exhibits a color-by-tilt effect, or a different color-by-rotation effect. Upon rotating the banknote 180, the indicia "100" will exhibit a color shift which may be uniform or different for the areas 181 to 185, so that the indicia "100" exhibits multi-colored color shifts therein. As noted above, a particular color behavior is preferably made specific to a particular denomination of a banknote, so that different colors are observable at different pre-determined viewing angles. By the way of example, a 20-dollar banknote may have the indicia "20" formed using trihedral pyramids, while a 100-dollar banknote may have the indicia "100" formed using pentagonal pyramids, so that the indicia "20" undergoes three full color shifts upon a full rotation of the 20-dollar banknote by 360 degrees, while the indicia "100" undergoes five full color shifts upon the full rotation of the 100-dollar banknote. Of course, the actual numbers of color shift per turn may vary. Groove structures having different pre-determined groove orientations in different areas of the substrate can also be used to form indicia discernible upon color shift observed upon rotation.

Figure 19:
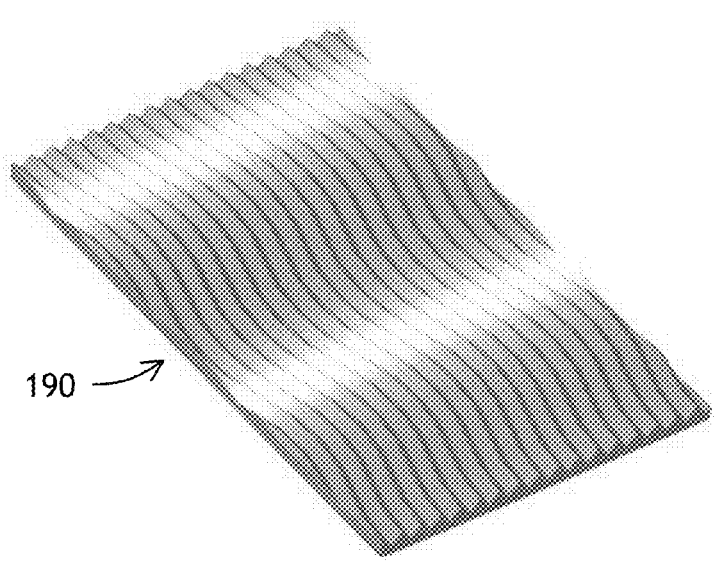
FIG. 19 is a three-dimensional view of a textured substrate exhibiting apparent color motion across the substrate, the motion being observed upon rotation of the substrate.

Referring now to FIG. 19, a three-dimensional view of an optical device 190 exhibiting an apparent color motion across the optical device 190 is presented. The optical device 190 has grooves running parallel to each other. The grooves direction varies smoothly, for example in a sinusoidal pattern. To the viewer of the optical device 190, the groove direction variation will create an apparent color variation pattern. As the device is rotated in the plane of the device, the pattern of colors will appear to move across the device 190.

The motion effect can also be created using a substrate having pyramidal structures, such as the structures 32 in FIG. 3 or 42 in FIG. 4. To create the motion effect, one of the surfaces 44 or 45 of FIG. 4 of the structures 42 of the substrate 30 is made to form a same local angle with respect to a line of observation, the angle varying smoothly across the substrate, so as to create an illusion of motion of color across the optical device observable by rotating the optical device in the plane of the substrate.

Figure 20A:
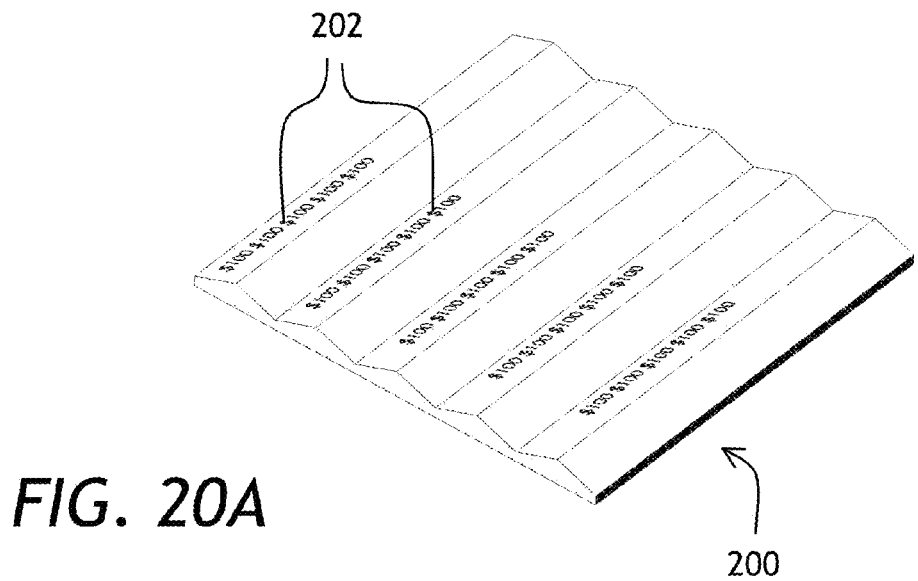
FIGS. 20A and 20B are three-dimensional views of an optical device having discernible indicia visible under a microscope.
Figure 20B:
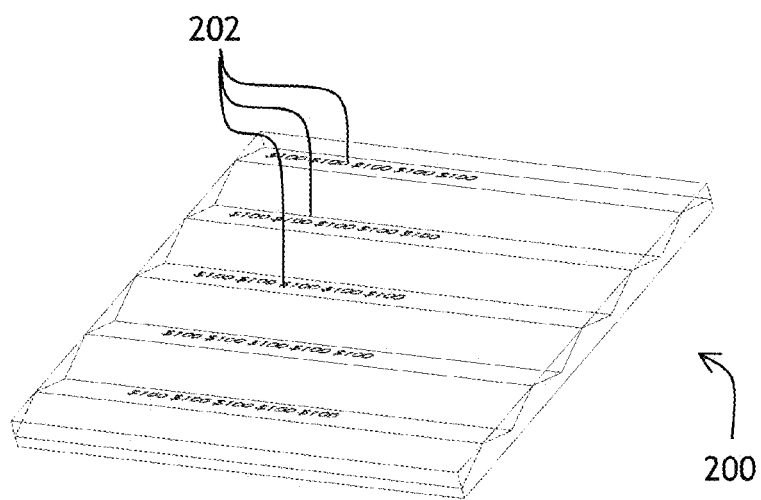

Turning to FIGS. 20A and 20B, three-dimensional views of an optical device 200 having discernible indicia 202 are shown, the different Figures corresponding to different angles of viewing. A color shifting coating of the device 200 has a reflector layer having the indicia 202 in form of an opaque pattern disposed thereon or therein. The indicia 202 are not seen by a naked eye; a microscope inspection is required to observe the indicia 202. This is an additional security feature that can be used, for instance, for banknote and credit card authenticity verification. E-beam lithography is preferably employed to create the indicia 202.

Figure 21B:
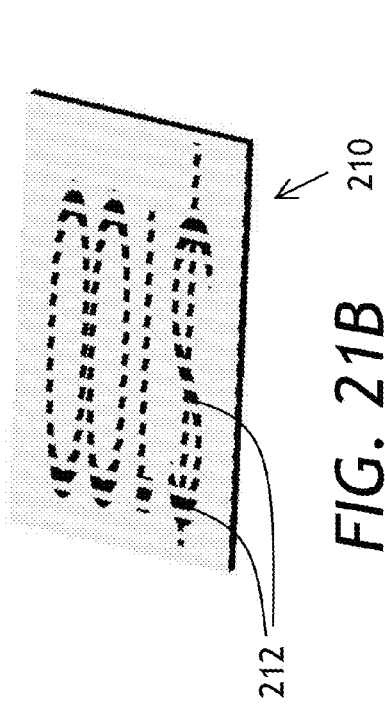
FIGS. 21A to 21D are three dimensional views of an optical device having discernible indicia visible by a naked eye.
Figure 21D:
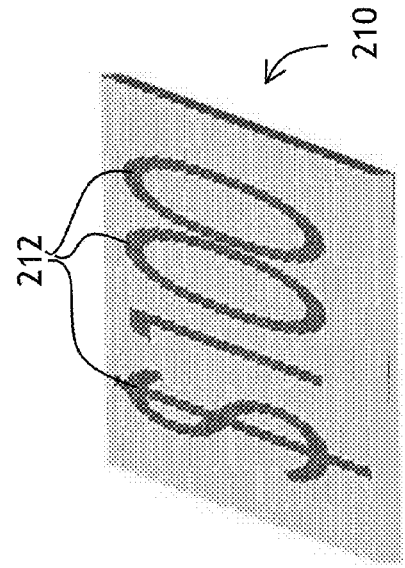
Figure 21A:
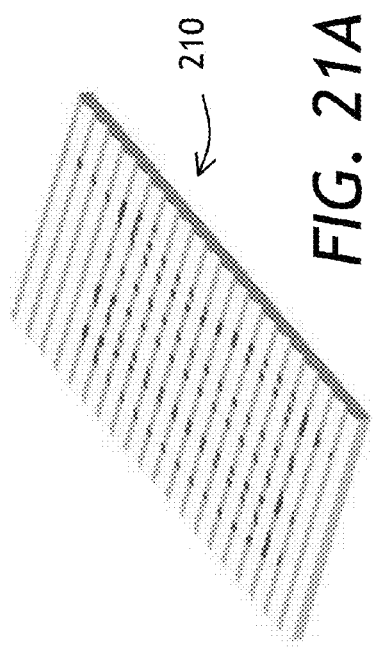
Figure 21C:
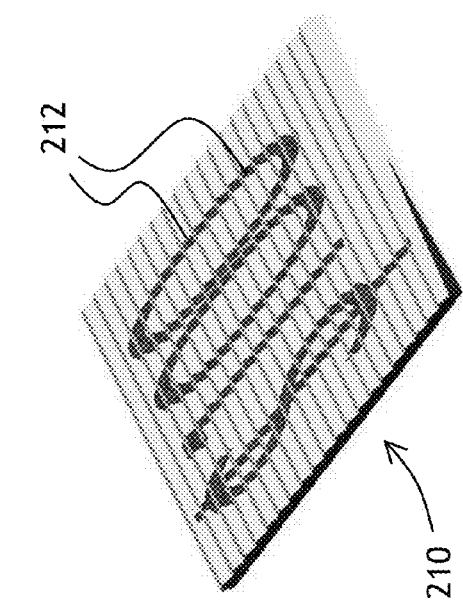

Referring now to FIGS. 21A to 21D, three-dimensional views of an optical device 210 having discernible indicia 212 are shown, at different angles of viewing. A color shifting coating of the device 210 has a reflector layer having the indicia 212 in form of a pattern disposed thereon or therein. The indicia 212 are only seen at certain angles of rotation of the optical device 210. In FIGS. 21A to 21D, the indicia 212 form a "$100" sign, which is best seen in FIG. 21D. This security feature can be used for banknote authenticity verification, credit card authentication, and the like. Micro-embossing can be used to create the indicia 212 resulting in a holographic or other differentiating visual effect.

Turning to FIG. 22, a cross-sectional view of an optical device 220 is shown. The optical device 220 exhibits an unexpected "flash-of-color" effect, at which bright colored indicia appear at a particular angle of rotation. The optical device 220 has a substrate 221 and a color shifting coating 222. The substrate 221 has a base layer 223, a planar reflector layer 224 supported by the base layer 223, and an intermediate transparent layer 225 supported by the planar reflector layer 224. The color shifting coating 222 is supported by the intermediate transparent layer 225 of the substrate 221. The color shifting coating 222 has a reflector layer 227, a dielectric layer 228, and an absorber layer 229. The reflector layer 227 has a plurality of voids 227A therein. The voids 227A form indicia discernible by color and observable at a first angle of rotation of the substrate 221 in its own plane. The indicia are observable when light propagates consecutively through the voids 227A in the reflector layer 227, through the intermediate transparent layer 225, and is reflected by the planar reflector layer 224 to propagate back through the layers in reversed order, that is, through the intermediate transparent layer 225, back through the voids 227A in the reflector layer 227, back through the dielectric layer 228, and back through the absorber layer 229.

Referring now to FIG. 23, a cross-sectional view of an optical device 230 is shown. The optical device 230 also exhibits the flash-of-color effect and has the same layers, except the transparent intermediate layer 225 of a substrate 231 now includes a "high-index" sublayer 236 adjacent the reflector 227 of the color shifting coating 222. The "high-index" sublayer has a refractive index of at least 1.4. Its presence has been found to enhance the "flash-of-color" effect. If layer 224 were to be a printed layer of highly colored ink, an optically variable ink, or even a fluorescent ink, then one would have at a certain angles of rotation a "flash" of new color or a flash of fluorescence in the presence of a black UV light as the "hole" in the reflector layer was aligned with the eye of the observer.

What is claimed is:

1. An optical device exhibiting a shift of color upon rotation, comprising:
    a substrate having an array of structures disposed thereon or therein, wherein each of the structures has first and second surfaces having a line of mutual intersection forming a non-zero angle with a plane of the substrate; and
    a color shifting coating supported by the substrate, forming color shifting reflectors with each of the first and second surfaces, wherein each color shifting reflector has a color which shifts as an angle of observation of the reflector changes, wherein upon rotation of the optical device in the plane of the substrate, the angle of observation of each color shifting reflector changes causing a corresponding color shift of each color shifting reflector, whereby the shift of color of the optical device is observable by rotating the optical device in the plane of the substrate;
    wherein the first and the second surfaces each have a width and a length larger than 2 microns, so that no significant diffraction of visible light occurs.

2. An optical device of claim 1, wherein the color shifting coating comprises an opaque reflector layer, an absorber layer, and a dielectric layer therebetween.

3. An optical device of claim 1, wherein the color shifting coating is disposed over the structures of the substrate.

4. An optical device of claim 3, wherein the color shifting coating has a reflector layer on top thereof, and wherein the substrate is sufficiently transparent for the color shift to be observable therethrough.

5. An optical device of claim 3, further comprising a substantially transparent cover layer supported by the color shifting coating and occupying at least a fraction of an area of the color shifting coating, wherein the color shift is visibly different in areas covered and not covered by the cover layer.

6. An optical device of claim 5, wherein the cover layer is patterned so as to form indicia discernible by color.

7. An optical device of claim 6, wherein the cover layer has an ink containing high-index nanoparticles, printed over the coating.

8. An optical device of claim 1, further comprising a microlens array supported by the substrate and optically coupled to the color shifting coating, so as to form indicia discernible by color.

9. An optical device of claim 1, wherein the structures have roughened surfaces for a matte finish.

10. An optical device of claim 1, wherein one of the surfaces of the structures of the substrate forms a local angle with respect to a line of observation, wherein the local angle is varying across the substrate, so as to create an apparent color motion across the optical device observable by rotating the optical device in the plane of the substrate.

11. A method of manufacturing of the optical device of claim 1, comprising:
    (a) providing an embossing tool having an embossing surface having a first plurality of parallel grooves and a second plurality of parallel grooves running at an angle to the first plurality of parallel grooves;
    (b) providing a blank substrate for texturing;
    (c) making an embossing of the blank substrate with the embossing tool; and
    (d) coating the substrate embossed in (c) with the color shifting coating forming the color shifting reflector therewith.

12. A method of manufacturing the optical device of claim 11, wherein in step (d), the color shifting coating is deposited in vacuum at an angle to the substrate of less than 90 degrees.

13. An optical security device comprising:
    a substrate having an array of structures disposed thereon or therein, wherein each of the structures has first and second surfaces having a line of mutual intersection forming a non-zero angle with a plane of the substrate; and
    a color shifting coating supported by the substrate, forming color shifting reflectors with each of the first and second surfaces, wherein each color shifting reflector has a color which shifts as an angle of observation of the reflector changes, wherein upon rotation of the optical device in the plane of the substrate, the angle of observation of each color shifting reflector changes causing a corresponding color shift of each color shifting reflector, whereby the shift of color of the optical device is observable by rotating the optical device in the plane of the substrate;
    wherein the first and the second surfaces each have a width and a length larger than 2 microns, so that no significant diffraction of visible light occurs.

14. A currency banknote or document comprising the optical security device of claim 13, wherein different colors observable at different pre-determined angles of rotation correspond to a denomination of the currency banknote banknote or document.

15. A currency banknote or a document or a token having an optical device incorporated therein, the optical device comprising:
    a substrate having an array of structures disposed thereon or therein, wherein each of the structures has first and second surfaces having a line of mutual intersection forming a non-zero angle with a plane of the substrate; and
    a color shifting coating supported by the substrate, forming color shifting reflectors with each of the first and second surfaces, wherein each color shifting reflector has a color which shifts as an angle of observation changes, wherein upon rotation of the optical device in the plane of the substrate, the angle of observation of each color shifting reflector changes causing a corresponding color shift of each color shifting reflector, whereby the shift of color of the optical device is observable by rotating the optical device in the plane of the substrate;
    wherein the first and the second surfaces each have a width and a length larger than 2 microns, so that no significant diffraction of visible light occurs.

* * * * *